F. E. WALK.
CULINARY UTENSIL.
APPLICATION FILED OCT. 9, 1911.
1,077,946.
Patented Nov. 4, 1913.
2 SHEETS—SHEET 1.
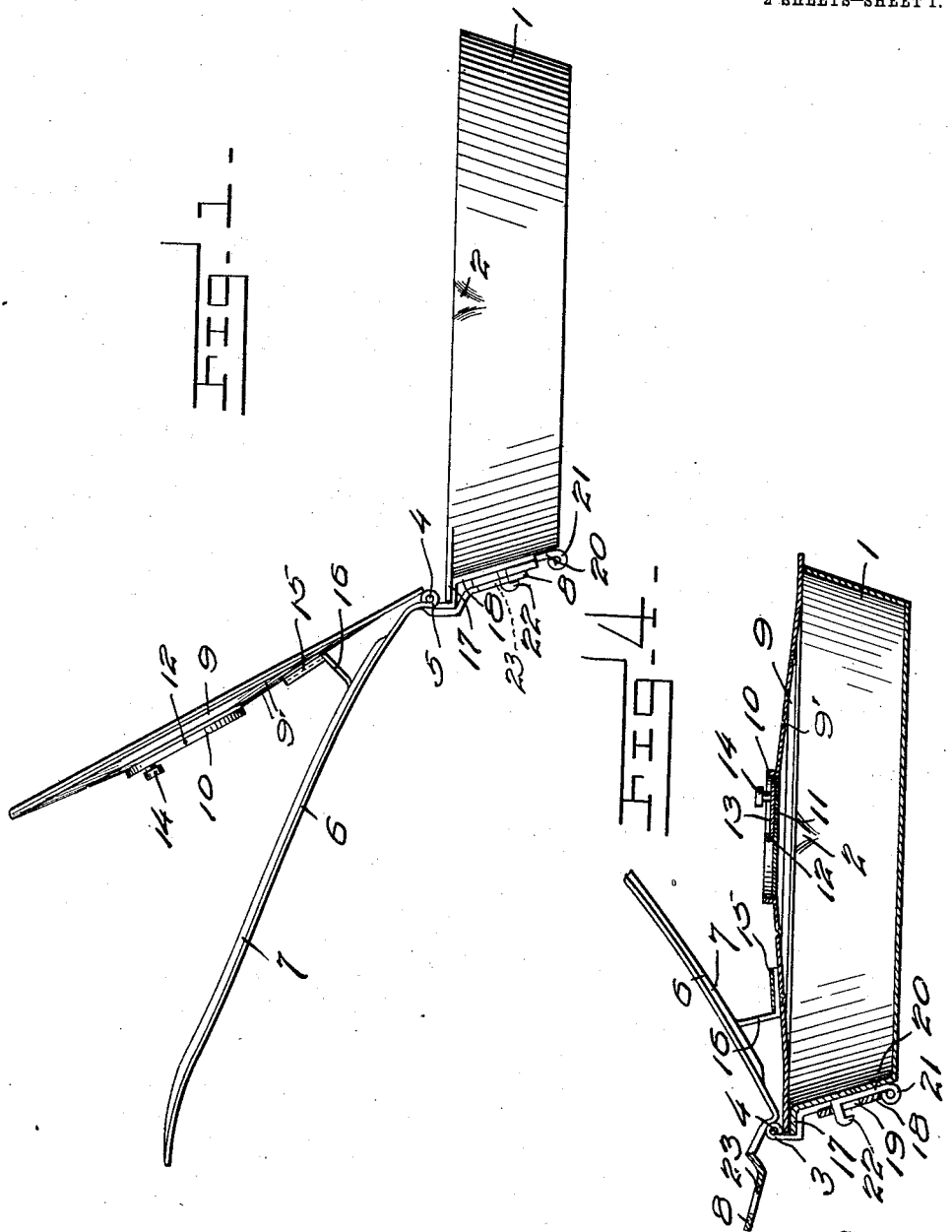
Witnesses
Inventor
F. E. Walk,
By Harry Ellis Chavalee
Attorney F. E. WALK.
CULINARY UTENSIL.
APPLICATION FILED OCT. 9, 1911.
1,077,946.
Patented Nov. 4, 1913.
2 SHEETS—SHEET 2.
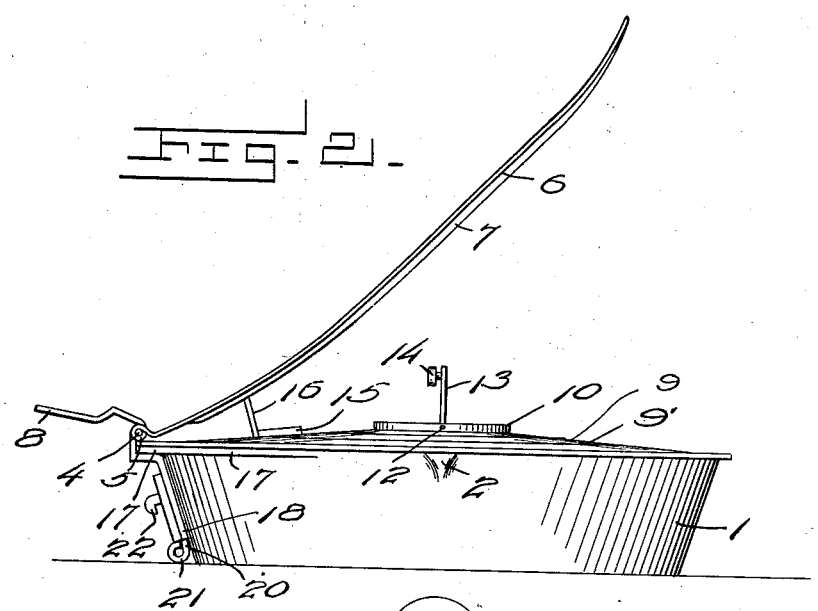
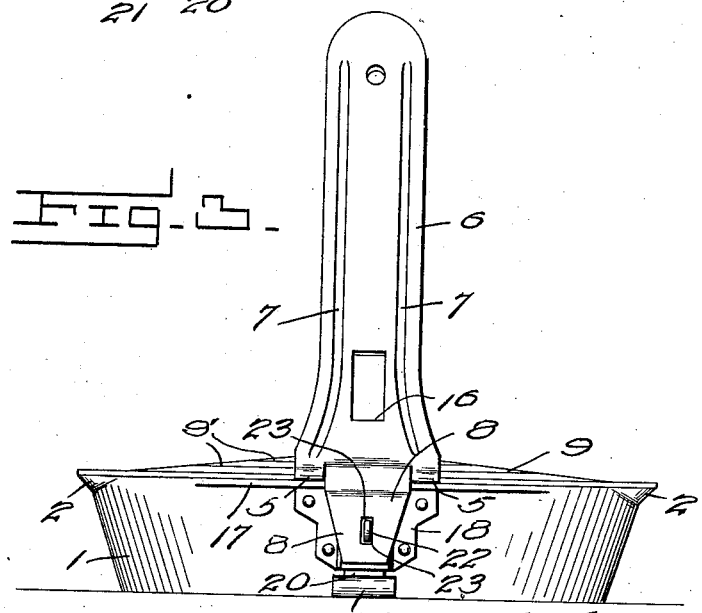
Witnesses
Inventor
F. E. Walk,
By Harry Ellis Chandlee
Attorney

UNITED STATES PATENT OFFICE.

FRANK E. WALK, OF ALLENTOWN, PENNSYLVANIA, ASSIGNOR OF ONE-HALF TO PHILIP J. BOYLE, OF HAZLETON, PENNSYLVANIA.

CULINARY UTENSIL.

1,077,946.  Specification of Letters Patent.  Patented Nov. 4, 1913.

Application filed October 9, 1911.  Serial No. 653,672.

*To all whom it may concern:*

Be it known that I, FRANK E. WALK, a citizen of the United States, residing at Allentown, in the county of Lehigh and State of Pennsylvania, have invented certain new and useful Improvements in Culinary Utensils, of which the following is a specification.

My invention relates to improvements in culinary utensils and has for its leading object the provision of an improved form of frying pan and folding handle adapted for use in connection therewith.

The further object of my invention is the provision of a handle which may be so disposed as to lie above the lid of the pan and be thus normally protected from the heat directed against the pan to at all times provide a cool handle which may be easily grasped.

Another object of my invention is to provide in connection with a pan having a pivoted handle a lid therefor adapted to be engaged and shifted by the handle, and means carried by the pan for automatically locking the handle in extended position as the pan is lifted thereby and for releasing the same when the pan is set down.

Other objects and advantages of my improved culinary utensil will be readily apparent by references to the following description taken in connection with the accompanying drawings and it will be understood that I may make any modifications in the specific structure shown and described within the scope of my claims without departing from or exceeding the spirit of my invention.

Figure 1 represents a side elevation of my improved pan with the handle in extended position, and the lid raised. Fig. 2 represents a side elevation with the handle in folded position. Fig. 3 represents an end view of the device, and Fig. 4 represents a fragmentary longitudinal sectional view thereof.

In the drawings, the numeral 1 designates a frying pan of ordinary shape and having the spout portion 2 at one side thereof and having a portion of its upper edge flared to form the inclined flange 17 which extends outward beneath the lower edge of the lid when the lid is in raised position, said flange receiving the drippings from the lid and guiding the same back into the pan instead of necessitating the setting down of the lid thus endangering getting the drippings on the kitchen table or some other piece of furniture. Secured to the rear of the pan is the guide bracket 18 having the longitudinally extending slot 19 formed therein, while slidably engaged within the bracket 18 is the plate 20 having the curled lower abutment end 21 and having projecting therefrom through the slot 19 in the bracket the hook lug or detent proper 22. This bracket 17 has an upwardly extending portion secured to the under side of the flange 17 and terminating in the curled hinge or pivot ear 3. Passing through the curled portion of the said ear 3 is the pivot 4 having its ends projecting from the ear and having engaged thereon the ears 5 which are cut from one end of the handle 6 which has the reinforcing ribs 7 and the projecting end 8 extending from between the ears 5.

To close the open top of the frying pan, I provide the lid 9 which has the upstanding central annulus 10 and has a perforated portion 11 inclosed by the annulus 10, a pivot 12 extending transversely of the annulus and having its ends secured thereto. Said pivot 12 has engaged thereon one edge of the cap member 13 having an upstanding handle knob 14, said cap being adapted to be swung downward to cover the perforated portion 11 of the lid or to be swung upward to allow the steam to escape through the perforations according to the character of the work to be done. The lid is also formed with the impressed annular ribs 9' for catching and evenly distributing the steam and vapors formed by cooking in the pan, which condense on the cover and drip from the ribs.

As is shown in the drawings, the handle 6 is normally disposed above the lid 9, and to enable me to raise the lid 9 as the handle is swung outward into extended position, I secure on the lid 9 the bracket member 15 adapted to engage the end of the L shaped tongue 16 which is cut and bent downward from the handle 6. The upward swinging of the said handle 6 serves to raise the lid without necessitating the grasping of the hot lid.

In order that the handle 6 may be readily locked in extended position to permit the pan to turn upside down without the same swinging against the handle and thus to hold the lid and handle in desired position, I employ my improved automatic detent 22.

When my pan is sitting on the stove or other surface, said surface will bear against the lower end 21 of the detent plate and will force the plate upward. With the detent in this position the outward swinging of the handle 6 will cause the slot 23 therein to pass downward over the hooked lug until the end 8 rests against the bracket 18. Lifting of the pan by its handle will move the plate out of engagement with the stove or other supporting surface and the weight of the detent bearing plate will cause the same to slide downward until the detent rests against the bottom of the slot 23 and curves down over the lower end of the handle to lock the handle in extended position. To release the handle, it is merely necessary to set the pan down or press against the end 21 of the detent plate to raise the detent into disengaging position.

From the foregoing description taken in connection with the accompanying drawings the construction of my improved pan and handle and lid therefor will be readily apparent and it will be seen that I have provided a thoroughly practical and desirable pan which will prevent over-heating of the handle and will obviate the necessity for grasping a hot lid with the fingers and which will consequently commend itself to all house-keepers as a highly desirable and satisfactory culinary utensil.

I claim:

1. The combination with a cooking utensil of a handle hinged thereto and having a longitudinal lip projecting beyond the hinge, said lip extending downwardly upon the utensil wall upon the handle being rocked to its outward limit of pivotal movement, and a downwardly opening hook slidably attached in upright position to the utensil wall and engageable with said lip.

2. The combination with a cooking utensil of a plate disposed on the exterior of the utensil wall and have a hinge lug projecting above said wall, a handle having hinge lugs at one end, and having an offset longitudinal lip between said hinge lugs and extending therebeyond, a pintle passed through the handle and plate hinge lugs, said lip extending downwardly along said wall upon said handle being rocked to its outer limit of pivotal movement, and a downwardly opening hook slidably attached in upright position to said plate and engageable with said lip.

3. The combination with a cooking utensil of a handle hinged at one end thereto and having a longitudinal lip projecting beyond said hinge, said lip extending downwardly along the utensil wall when the handle is rocked outwardly and being provided with an eye, and a downwardly opening hook having a shank slidably fitted in upright position on said wall and projecting below the utensil bottom, said hook gravitating into engagement with said eye upon said utensil being raised by said handle and locking said handle to said wall, said shank contacting with a support upon which the utensil may be placed and raising said hook from engagement with said eye whereby to release said handle.

4. The combination with a pan, of a handle pivoted thereto and having its lower end terminating in a depending portion, a longitudinal slot formed therein, a lid connected to the handle, a guide bracket secured to the pan and having a vertical slot formed therein, a detent slidably mounted in the bracket and having a hooked lug adapted to protrude through said slot, said lug being adapted to pass through the longitudinal slot of the depending portion of the handle when the slot therein is in registry with the slot of the guide bracket, said lug serving to lock the depending portion to hold the handle in its extended position when the pan is raised, the lower end of the detent being adapted to engage a support to automatically unlock the depending portion when the pan is set down so that the handle may be swung upon its pivot to position the lid upon the pan to close the same.

In testimony whereof I affix my signature, in the presence of two witnesses.

FRANK E. WALK.

Witnesses:
H. G. SCHOLL,
FRED J. WOLFERTZ.

---

Copies of this patent may be obtained for five cents each, by addressing the "Commissioner of Patents, Washington, D. C."